United States Patent

Schott et al.

[15] 3,687,924
[45] Aug. 29, 1972

[54] PRECIPITATION POLYMERIZATION OF α-METHYLSTYRENE

[72] Inventors: Herbert Schott, Hofheim/Taunus; Walter Herwig, Frankfurt/Main; Siegfried Sommer, Bad Soden/Taunus, all of Germany

[73] Assignee: Farbwerke Hoechst Aktiengesellschaft vormals, Meister Lucius & Bruning, Frankfurt/Main, Germany

[22] Filed: Dec. 5, 1969

[21] Appl. No.: 882,703

[30] Foreign Application Priority Data

July 30, 1969 Germany..........P 18 14 870.4

[52] U.S. Cl.............260/93.5 S, 260/95 R, 252/430
[51] Int. Cl.............C08f 7/02, C08f 1/11
[58] Field of Search.................260/93.5 S

[56] References Cited

UNITED STATES PATENTS

| | | |
|---|---|---|
| 2,327,082 | 8/1943 | Walker....................260/93.5 |
| 2,658,058 | 11/1953 | Werkema................260/93.5 |
| 3,070,574 | 12/1962 | Kastning..................260/93.5 |
| 3,169,948 | 2/1965 | Hardy......................260/93.5 |
| 2,920,065 | 1/1960 | Myerholtz et al.........260/93.5 |
| 3,069,405 | 12/1962 | McCormick et al......260/93.5 |
| 3,288,872 | 11/1966 | House......................260/84.7 |
| 3,402,160 | 9/1968 | Hayes......................260/93.5 |

FOREIGN PATENTS OR APPLICATIONS 1,191,103   4/1965   Germany..................260/93.5

Primary Examiner—James A. Seidleck
Attorney—Curtis, Morris & Safford

[57] ABSTRACT

The present invention relates to a process for precipitation polymerization of α-methylstyrene in a hydrocarbon medium in which poly-α-methylstyrene is insoluble or only little soluble. The polymerization is initiated by a finely divided alkali metal which is used together with certain phosphoric acid amides or ethers or mixtures thereof as polymerization accelerators.

9 Claims, No Drawings

PRECIPITATION POLYMERIZATION OF α-METHYLSTYRENE

The present invention relates to a process for precipitation polymerization of α-methylstyrene.

In the presence of free radical initiators α-methylstyrene, in contradistinction to styrene, can only be polymerized to products of low molecular weight. High molecular weight homopolymers of α-methylstyrene can be obtained using Friedel-Crafts catalysts, but only if low temperatures are applied (−75° C. and therebelow).

Processes in which the polymerization is carried out in the presence of finely divided alkali metals are more advantageous, as described, for example, in U.S. Pat. Nos. 2,621,171 and 2,658,058. High molecular weight polymers are thus obtained at a temperature preferably in the range of from 0° to 30° C., but reaction periods of more than 10 hours, partially 100 hours and longer are necessary to obtain high conversion rates. The reaction periods can be shortened by adding ethylene glycol dialkyl ethers (U.S. Pat. No. 2,920,065), cyclic ethers or acetals (German Pat. No. 1,065,611) or oxalkylated phenols (German Pat. Nos. 1,169,134 and 1,191,103) as reaction accelerators.

In the aforesaid processes the α-methylstyrene is polymerized either in the mass or in solution, whereby various drawbacks are encountered. In the mass polymerization it is difficult to remove an excess of catalyst or of α-methylstyrene necessitating dissolution, filtration and subsequent precipitation of the polymer. After separation of the polymer large amounts of solvent mixture have to be worked up. Polymerization in solution entails, of course, the same drawback. Moreover, in the aforesaid processes the molecular weight of the formed poly-α-methylstyrene is difficult to regulate.

The present invention provides a process for precipitation polymerization of α-methylstyrene which may carry substituents and has the general formula

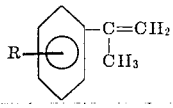

in which R may stand for H, $CH_3$, $C_2H_5$, or $CH(CH_3)_2$, which comprises adding the monomer to a mixture consisting of
a. a hydrocarbon which is inert towards alkali metals and in which the poly-α-methylstyrene is insoluble or only little soluble,
b. a finely divided alkali metal or a mixture of at least two finely divided alkali metals in an amount of from 0.01 to 5.0 percent by weight, preferably 0.1 to 1.0 percent by weight, calculated on the monomer, and
c. a phosphoric acid amide of the general formula $O = P(NR_2)_3$ or a mixture of a phosphoric acid amide and an ether of the general formula $R'(OCH_2CH_2)_nOR''$, in which formulae R, R', and R'' stand for identical or different alkyl groups having one to eight carbon atoms, or aryl groups and $n$ is 0 to 20, and/or a 5- or 6-membered cyclic, mono or polyvalent ether, and optionally a polynuclear aromatic hydrocarbon, preferably naphthalene, anthracene or phenanthrene, in an amount of from 0.1 to 40 percent by weight, preferably 3 to 25 percent by weight, calculated on the hydrocarbon defined sub (a), and polymerizing the monomer at a temperature in the range of from −20° to +60° C., preferably −10° to +20° C.

The process of the invention offers the known advantages of a precipitation polymerization, i.e. the poly-α-methylstyrene is obtained in the form of fine granules which are easy to stir and to filter. Moreover, by the process of the invention α-methylstyrene can be transformed within 5 to 10 minutes into polymers of high molecular weight, whereas in the aforesaid mass and solution polymerization processes hours or even days are required. After interruption of the polymerization, for example by adding small amount of alcohol or introducing air, the polymer can be separated from the solvent by simple filtration.

Owing to the fact that small amounts of catalyst are sufficient, the catalyst reaction products remaining in the polymerization mixture after interruption of the reaction need not be removed. The remaining portion of α-methylstyrene is dissolved in the solvent and removed therewith. In general, it is not necessary to dissolve and reprecipitate the polymer. Working up of the solvent mixture can be dispensed with as the composition of the filtrate corresponds to that of the starting mixture used for polymerization so that it can be reused.

Monomeric starting compounds to be used in the process of the invention are compounds of the formula

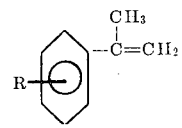

in which R stands for H, $CH_3$, $C_2H_5$ or $-CH(CH_3)_2$, α-methylstyrene being preferred. The monomers should be free from impurities which may react with alkali metals and thus interrupt the reaction. The best results are obtained with α-methylstyrene compounds which have been distilled prior to polymerization under an inert gas and in the presence of, for example, $LiAlH_4$ or $Al(i(C_4H_9)_3$. When the monomers are stored for a prolonged period of time they should be protected against the action of air or oxygen.

The process of the invention is carried out in the presence of solvents which are inert towards alkali metals and in which the poly-α-methylstyrene is insoluble or only little soluble, so that under the reaction conditions specified below the polymer is obtained in the form of granules that can be readily filtered.

It is also possible, of course, to use mixtures of solvents and nonsolvents, whereby during the course of polymerization smaller or larger amounts of fractions of low molecular weight that are more readily soluble are dissolved and can be removed. Suitable solvents are, for example, paraffin hydrocarbons or mixtures thereof, such as pentane, hexane, heptane, octane, cyclopentane, cyclohexane and light mineral oils. Additives with dissolving power are, for example, aromatic hydrocarbons such as benzene, toluene or xylene. The proportion by volume of solvent to monomer can vary in the range of from 20 : 1 to 0.5 to 1, preferably 8 : 1 to 1 : 1.

The amount of alkali metal used as catalyst can vary within wide limits of from 0.01 to 5 percent by weight, preferably 0.1 to 1.0 percent by weight, calculated on the amount of α-methylstyrene to be polymerized. By the amount of alkali metal used the molecular weight of the poly-α-methylstyrene is regulated (cf. Examples 3 to 7). The other parameters such as temperature, amount of phosphoric acid amide, solvent and α-methylstyrene must then be maintained constant as they influence also the yield and the molecular weight (cf. Example 10 to 17). The pretreatment and distribution of the alkali metal are of decisive importance in the process of the invention. To carry out a rapid and as quantitative as possible a reaction the diameter of the metal particles should be less than 1 mm, if possible about 0.1 mm and thereunder. Finely divided metals of this type can be produced by known methods. Metallic sodium can be dispersed while vigorously stirring, for example in hot toluene, petroleum, xylene or another inert hydrocarbon or the liquid metal can be atomized through nozzles into the hydrocarbons. It is likewise possible to stir solutions of alkali metals, for example in a mixture of phosphoric acid tridimethylamide and tetrahydrofuran, into paraffin hydrocarbons whereby the metal is obtained in a very fine highly active form. If commercial alkali metal dispersions are used, it is advantageous slightly to "etch" the metal, for example in heptane-phosphoric acid trisdimethylamide mixtures of high phosphoric acid amide content. Etching can be accelerated at elevated temperature. By diluting the dispersion thus treated with further amounts of heptane a mixture suitable for polymerization is obtained. All operations described should be carried out with the exclusion of air. In the process of the invention all alkali metals can be used, sodium being especially preferred owing to its easy accessability, for example in the form of a dispersion in mineral oils or aromatic hydrocarbons.

A sodium dispersion in aliphatic hydrocarbons, for example in heptane, does practically not react at 0° C. with α-methylstyrene. The α-methylstyrene is only polymerized when certain polymerization accelerators are added. Especially suitable accelerators are compounds of the formula $O = P(NR_2)_3$ or mixtures of $O = P(NR_2)_3$ and $R'(OCH_2CH_2)_nOR''$ in which $n$ stands for 0 to 20 and $R'$ and $R''$ may be combined to a ring. In the formulae $R$, $R'$ and $R''$ represent identical or different alkyl or aryl radicals having one to eight carbon atoms. Suitable compounds of the formula $O = P(NR_2)_3$ are, for example, phosphoric acid trisdimethylamide, phosphoric acid trisdiethylamide, phosphoric acid trisdi-n-propylamide, phosphoric acid trisdicyclohexylamide; examples of compounds of the formula $R'(OCH_2CH_2)_nOR''$ are dimethoxyethane, phenolglycol ether and tetrahydrofuran. The proportion by volume of phosphoric acid amide to ether can range of from 0 : 10 to 8 : 2, preferably 0.1 : 9.9 to 2 : 8.

The action of the phosphoric acid amides or of the mixtures of phosphoric acid amides and ether can be further improved by adding condensed aromatic hydrocarbons, such as naphthalene, anthracene and phenanthrene. With regard to the proportion of accelerator added, care must be taken that the addition is large enough to obtain a high reaction speed but that it is not too large as the aforesaid compounds are partly good solvents for poly-α-methylstyrene, i.e. in a reaction mixture containing same the formed polymers precipitate only partially or not at all. In the case of phosphoric acid trisdimethylamide the aromatic hydrocarbon is preferably used in an amount of from 0.1 to 40 percent by weight, more preferably 3 to 25 percent by weight in the solvent mixture of aliphatic hydrocarbon, for example heptane, and phosphoric acid amide.

In order to obtain a high molecular weight and a high reaction speed definite temperature limits should not be exceeded. The lower temperature limit is defined by the type and amount of polymerization accelerator used. When the polymerization is catalyzed by means of sodium in a mixture of 100 grams of heptane and 25 grams of phosphoric acid trisdimethylamide, it is necessary, for example, to operate at a temperature above −10° C. since otherwise the reaction speed is too low. On the other hand, at a temperature above +30° C. the polymerization carried out in the same mixture only yields compounds of low molecular weight which are partially liquid. When a high yield of high molecular weight poly-αmethylstyrene is desired within a relatively short period of time, polymerization should be carried out at a temperature in the range of from −10° to + 30° C., preferably 0° to 10° C.

When, for example, 23 grams of α-methylstyrene are added to a mixture, prepared as described above, of 100 grams of heptane, 25 grams of phosphoric acid amide and 0.075 gram of dispersed sodium, reaction sets in at once with increase in temperature. The reaction is practically terminated after 5 to 10 minutes. When the polymerization is interrupted, for example by adding a small amount of methyl alcohol or introducing air, granular poly-α-methylstyrene is obtained in a yield of up to 93 percent of the theory which, after filtration, washing with heptane and drying, has a reduced specific viscosity of 0.7 to 1.1, (average values of several experiments).

Polymerization is advantageously carried out by introducing the individual reactants one after the other into a vessel filled with nitrogen, argon or another inert gas. The reaction takes place with evolution of heat and it is, therefore, advantageous to cool the vessel in order that precipitating poly-α-methylstyrene does not agglomerate and renders difficult the filtration. Moreover, at higher temperatures the yield and the reduced specific viscosity of the polymer are detrimentally affected (cf. Example 17).

Alternately, the process of the invention can be carried out continuously by removing the polymer formed continuously from the reactor and simultaneously introducing separately aliphatic hydrocarbon, polymerization accelerator, sodium dispersion and α-methylstyrene. As reactor a tube may be used at the one end of which the reactants are introduced while at the other end the reaction products are removed. By variation of the tube volume and the rate of flow any desired reaction period can be adjusted.

The following examples illustrate the invention, the values of the reduced specific viscosity indicated in the examples were determined by comparison of the time of outflow of a 1 % benzenic solution of the polymer $(v_1)$ with the time of outflow of pure benzene $(v_0)$ $RSV = v_1/v_0 - 1$.

EXAMPLE 1

In a 1 liter flask in an atmosphere of argon 0.275 g of sodium dispersed in about 0.5 cc of mineral oil was added to a vigorously stirred mixture of 100 cc of heptane and 100 cc of phosphoric acid trisdimethylamide.

The blue mixture obtained was stirred for 10 minutes and then diluted with 500 cc of heptane whereupon the color turned to reddish brown. After cooling to +2° C. 100 cc of α-methylstyrene were added. By external cooling care was taken that the temperature of the mixture did not exceed +5° C. About 1 to 2 minutes after the addition of α-methylstyrene the poly-α-methylstyrene separated in granular form. The mixture was stirred for about another 30 minutes, the sodium-organic compound was destroyed by adding 2 cc of CH$_3$OH and the reaction mixture was filtered at 0° C. The polymer was washed with ice-cold heptane. Yield 81 grams of poly-α-methylstyrene having a reduced specific viscosity of 1.48.

EXAMPLE 2

0.075 gram of sodium dispersed in about 0.1 g of mineral oil was dissolved in a mixture of 2.5 cc of phosphoric acid trisdimethylamide and 2.5 cc of tetrahydrofuran. The sodium solution was dropped into a mixture of 150 cc of heptane and 25 cc of phosphoric acid trisdimethylamide whereby the sodium precipitated in finely divided form and a weakly red dispersion was obtained. The mixture was cooled to +1° C. and 25 cc of α-methylstyrene were added while an increase in temperature above +5° C. was avoided by external cooling. The poly-α-methylstyrene methylstyrene precipitated in the form of fine granules within 2 to 3 minutes. The reaction mixture was stirred for another 30 minutes, the polymerization was interrupted by adding a little methanol and the polymer was filtered off at 0° C. It was washed with cold heptane. The yield of dried poly-α-methylstyrene amounted to 20.1 grams, the polymer had a reduced specific viscosity of 1.17.

EXAMPLE 3 to 17

In the following examples the catalyst was prepared as described in Example 1. The smaller amount of heptane indicated in the table was mixed with the phosphoric acid amide, the sodium dispersed in mineral oil was added, the mixture was stirred for 10 minutes and then diluted with the higher amount of heptane.

TABLE 1

| Number | Heptane, cc. | Phosphoric acid trisdimethylamide, cc. | Sodium dispersed in mineral oil | α-Methylstyrene, cc. | Temperature, °C. | Duration of experiment, minutes | Yield g. | RSV-value |
|---|---|---|---|---|---|---|---|---|
| 3 | 25+125 | 25 | 0.050 | 25 | +2 to +4 | 30 | 18.9 | 1.32 |
| 4 | 25+125 | 25 | 0.100 | 25 | +2 to +5 | 30 | 17.8 | 1.02 |
| 5 | 25+125 | 25 | 0.150 | 25 | +2 to +4 | 30 | 19.6 | 0.38 |
| 6 | 25+125 | 25 | 0.200 | 25 | +2 to +4 | 30 | 13.5 | 0.18 |
| 7 | 25+125 | 25 | 0.250 | 25 | +2 to +5 | 30 | 13.0 | 0.07 |
| 8 | 25+125 | 25 | 0.075 | 25 | +1 to +5 | 5 | 11.6 | 0.94 |
| 9 | 150+750 | 120 | 0.350 | b320 | +3 to +5 | c10 | | 1.79 |
|   |         |     |       |      |          | c47 | | 1.84 |
|   |         |     |       |      |          | c92 | | 1.38 |
|   |         |     |       |      |          | c155 | | 1.54 |
|   |         |     |       |      |          | c222 | | 1.45 |
| 10 | d150 | 20 | 0.075 | 25 | +2 to +5 | 30 | 18.0 | 0.88 |
| 11 | 15+135 | 15 | 0.075 | 25 | +1 to +5 | 30 | 17.2 | 0.83 |
| 12 | 10+140 | 10 | 0.075 | 25 | +2 to +5 | 30 | 3.7 | 1.55 |
| 13 | 10+140 | 10 | 0.150 | 25 | +2 to +5 | 30 | 15.7 | 0.96 |
| 14 | 10+140 | e10 | 0.075 | 25 | +2 to +6 | 30 | 14.9 | 0.91 |
| 15 | 5+145 | 5 | 0.500 | 25 | +1 to +5 | 30 | 10.7 | 0.98 |
| 16 | 25+125 | 20 | 0.075 | 60 | +2 to +5 | 30 | 49.7 | 1.26 |
| 17 | 25+125 | 20 | 0.075 | 25 | +8 to +14 | 30 | 3.6 | 0.14 | a Added over a period of 1 to 7 minutes if not indicated otherwise.
b Dropped in over a period of 10 minutes.
c After the indicated reaction period samples were taken, methyl alcohol was added, the mixture was filtered and the residue was dried at 1-0° C. under 100 mm. of mercury.
d Total amount of heptane, phosphoric acid amide and sodium dispersion was stirred for 3 hours at 20° C.
e Plus 10 dimethoxyethane.

EXAMPLE 18

In a 6 liter glass flask in an atmosphere of inert gas 2.25 grams of sodium dispersed in about 4 cc of mineral oil were added to a mixture of 910 cc of heptane and 725 cc of phosphoric acid trisdimethylamide. The mixture was stirred for 10 minutes and 2,500 cc of heptane were added to the blue mixture. The content of the flask was transferred to a vessel with stirrer having a capacity of 12 liters and further 2,050 cc of heptane were added. The mixture was cooled to +3° C. and, while vigorously stirring, 1,895 cc of α-methylstyrene were added uniformly over a period of 30 minutes. The temperature of the reaction mixture was maintained below +6° C. by external cooling. After having stirred for another 15 minutes, 30 cc of α-methylstyrene were added to the mixture and stirring was continued until the red color of the mixture had completely disappeared. The mixture was filtered through a suction filter, air was aspirated through the filter cake for several hours in order to remove the main quantity of heptane and the polymer was dried at 120° C. under a pressure of 100 mm of mercury. 1,537 grams of finely pulverulent white poly-α-methylstyrene having a reduced specific viscosity of 2.08 were obtained.

EXAMPLE 19

In a 250 cc glass flask 150 cc of heptane, 20 cc of phosphoric acid trisdimethylamide and 25 cc of α-methylstyrene were mixed in an atmosphere of an inert gas, the mixture was cooled to +1° C. and a solution of 0.075 gram of sodium in a mixture of 2.5 cc of phosphoric acid trisdimethylamide and 2.5 cc of tetrahydrofuran was added. Flocculent poly-α-methylstyrene separated at once. The temperature was maintained below +7° C. by external cooling. 30 minutes after the addition of the sodium solution, 1 cc of methyl alcohol was added, the poly-α-methylstyrene was filtered off and dried at 120° C. under a pressure of 100 mm of mercury. 15.4 grams of polymer were obtained having a reduced specific viscosity of 0.42.

EXAMPLE 20

0.075 grams of sodium dispersed in about 1 cc of mineral oil was dissolved in a mixture of 5 cc of tetrahydrofuran and 0.186 g of naphthalene. The solution obtained was added dropwise to a mixture of 75 cc of heptane and 25 cc of phosphoric acid trisdimethylamide. After dilution with further 75 cc of heptane, 25 cc of α-methylstyrene were added at 1° – 2° C., the mixture was kept at about 0° C. for 30 minutes, then a small amount of methyl alcohol was added and the precipitated poly-α-methylstyrene was filtered off. After washing with cold heptane and drying, 18.1 grams of polymer having a reduced specific viscosity of 0.40 were obtained.

small amount of methanol and the polymer was filtered off at about 0° C. The polymer was then washed with cold heptane and dried at 150° C.

Referring to Table: 2

1. The indicated amount of sodium in the form of a dispersion in mineral oil in a ratio of 1 : 2 was stirred under nitrogen for about 10 minutes with the specified amount of phosphoric acid trisdimethylamide and the solution was diluted as indicated. In Example 31 the sodium dispersion, naphthalene and tetrahydrofuran were stirred for 15 minutes. 2. 0/+4 means that at the beginning of the reaction the temperature was 0° C. and rose during polymerization to at most +4° C. (+2)+15/+23 means that at the beginning the temperature was +2° but that no reaction set in at said temperature. Polymerization set in when the temperature was raised to +15° C., the maximum temperature being at +23° C.

TABLE 2

| Ex. No. | Sodium, g.,[1] dispersed in mineral oil | Phosphoric acid amide, cc. | Plus | Cc. | Accelerator | Cc. | Temperature, °C.[2] | Yield, g. | Reduced specific viscosity |
|---|---|---|---|---|---|---|---|---|---|
| 22 | 0.075 | 1.25 | 1,2-dimethoxyethane | 3.75 | 1,2-dimethoxyethane | 15.0 | +2/+4 | 34.5 | 1.03 |
| 23 | 0.075 | 1.25 | do | 3.75 | do | 35.0 | +2/+4 | 36.8 | 0.95 |
| 24 | 0.075 | 0.6 | Tetrahydrofuran | 4.4 | | | (+2)+15/+23 | 28.7 | 0.24 |
| 25 | 0.075 | 0.6 | do | 4.4 | Tetrahydrofuran | 20.0 | +1/+4 | 37.8 | 0.85 |
| 26 | 0.075 | 2.0 | do | 3.0 | do | 5.0 | 0/+5 | 21.3 | 1.35 |
| 27 | 0.075 | 2.5 | do | 2.5 | do | 10.0 | +1/+5 | 32.7 | 1.12 |
| 28 | 0.075 | 2.5 | do | 2.5 | do | 20.0 | +2/+5 | 38.4 | 0.96 |
| 29 | 0.075 | 2.5 | do | 2.5 | do | 30.0 | +1/+4 | 36.8 | 0.87 |
| 30 | 0.050 | 2.5 | do | 2.5 | do | 30.0 | +2/+4 | 35.2 | 1.24 |
| 31 | 0.075 | | {Tetrahydrofuran / Plus naphthalene} | 20.0 / 0.1 g. | | | 0/+5 | 17.2 | 0.31 |
| 32 | 0.075 | 1.0 | 1,4-dioxan | 4.0 | | | (+2)+15/+20 | 2.34 | 0.41 |
| 33 | 0.075 | 1.25 | do | 3.75 | 1,4-dioxan | 5.0 | (+2)+5/+10 | 23.9 | 1.20 |
| 34 | 0.075 | 1.25 | do | 3.75 | do | 10.0 | (+2)+5/+10 | 30.4 | 0.76 |
| 35 | 0.075 | 2.5 | do | 2.5 | do | 15.0 | +1/+5 | 33.7 | 0.99 |

EXAMPLE 21

In a 250 cc glass flask in a nitrogen atmosphere, 0.1 cc of sodium-potassium alloy (75 percent by weight K, 25 percent by weight Na) was finely dispersed in 20 cc of tetrahydrofuran by stirring for 5 minutes with a rapid stirrer (10,000 revolutions per minute). The dispersion was diluted with 150 cc of heptane and the mixture was cooled to +1° C. 50 cc of α-methylstyrene were then added while stirring. By external cooling care was taken that the temperature of the mixture did not exceed +5° C. The reaction was interrupted after 90 minutes by adding 2 cc of methanol, the poly-α-methylstyrene, separated in the form of granules, was filtered off at 0° C., washed with ice-cold heptane and dried at 150° C. 29.4 grams of poly-α-methylstyrene having a reduced specific viscosity of 0.35 were obtained.

EXAMPLES 22 - 35

In the following examples the indicated amount of metal was dissolved in the indicated amount of phosphoric acid trisdimethylamide and accelerator. The solution obtained was dropped into the stirred mixture of 150 cc of heptane and accelerator. After cooling, 50 cc of α-methylstyrene were added over a period of 1 to 2 minutes and the specified temperature was allowed to adjust by external cooling. The mixture was stirred for a further 30 minutes (in Example 31 for 100 minutes), the polymerization was stopped by adding a

What is claimed is:

1. A process for precipitation polymerization of α-methylstyrene of the formula

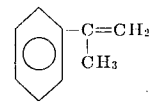

which comprises adding the monomer to a mixture consisting of
   a. a hydrocarbon that is inert towards alkali metal and in which the poly-α-methylstyrene is insoluble or at most little soluble,
   b. at least one finely dispersed alkali metal in an amount of from 0.01 to 5.0 percent by weight calculated, on the monomer, and
   c. an accelerator selected from the group consisting of:
      1. a phosphoric acid amide of the formula O P(NR$_2$)$_3$ in which R represents identical or different alkyl groups having one to eight carbon atoms or aryl groups, and
      2. a mixture of a said amide with a member of the group consisting of (x) an ether of the formula R'(OCH$_2$CH$^2$)$_n$OR" in which R' and R" represent identical or different alkyl groups having one to eight carbon atoms or aryl groups and $n$ is an integer in the range of from 0 to 20, (y) a five or six membered cyclic mono- or polyvalent ether and (z) mixtures of components (x) and (y), said accelerator being present in an amount of 0.1 to 40 percent by weight calculated on the hydrocarbon, and polymerizing the monomer at a temperature of from −20° to +60° C.

2. The process of claim 1, wherein the alkali metal is used in an amount of from 0.1 to 1.0 percent by weight.

3. The process of claim 7, wherein the alkali metal is used in an amount of from 0.1 to 1.0 percent by weight.

4. The process of claim 1, wherein the polymerization is carried out at a temperature in the range of from −10° to +20° C.

5. The process of claim 7, wherein the polymerization is carried out at a temperature in the range of from −10° to +20° C.

6. The process of claim 7, wherein the polynuclear aromatic hydrocarbon is naphthalene, anthracene or phenanthrene.

7. A process as recited in claim 1 comprising adding the monomer to a mixture which contains additionally a polynuclear aromatic hydrocarbon, the said accelerator being present in an amount of from 3 to 25 percent by weight calculated on the hydrocarbon.

8. A process as recited in claim 1 wherein phosphoric acid amide and ether are added in a ratio in the range of from 0.1:9.9 and 2:8.

9. A process as recited in claim 7 wherein phosphoric acid amide and ether are added in a ratio in the range of from 0.1:9.9 and 2:8.

* * * * *